United States Patent [19]
Grant

[11] Patent Number: 5,839,418
[45] Date of Patent: Nov. 24, 1998

[54] DUAL STAGE NITROUS OXIDE AND FUEL INJECTION PLATE

[75] Inventor: Barry Grant, Dahlonega, Ga.

[73] Assignee: BG 300, Inc., Dahlonega, Ga.

[21] Appl. No.: 984,788

[22] Filed: Dec. 4, 1997

Related U.S. Application Data

[60] Provisional application No. 60/033,351, Dec. 6, 1996.
[51] Int. Cl.[6] .................................................. F02B 23/00
[52] U.S. Cl. ........................... 123/585; 123/590; 261/118
[58] Field of Search .................................... 123/585, 590; 261/118

[56] References Cited

U.S. PATENT DOCUMENTS 5,743,241  4/1998  Wood et al. ............................. 123/585

*Primary Examiner*—Noah P. Kamen
*Attorney, Agent, or Firm*—Thomas, Kayden, Horstemeyer & Risley

[57] ABSTRACT

A fuel supply module located between the carburetor and intake manifold is disclosed for spraying fuel and nitrous oxide. The module has two pairs of adjacent conduits that are perpendicular to each other and span the intake passage. One conduit in each pair has nozzles for spraying fuel and the other conduit has nozzles for spraying nitrous oxide. The conduit for spraying fuel being downstream of the conduit for spraying nitrous oxide.

1 Claim, 2 Drawing Sheets

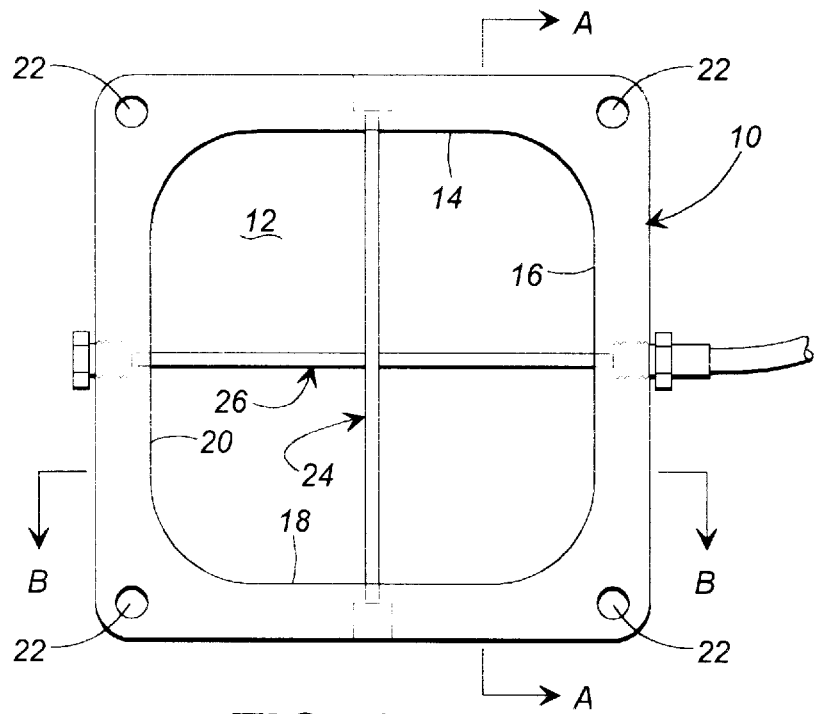
FIG. 1
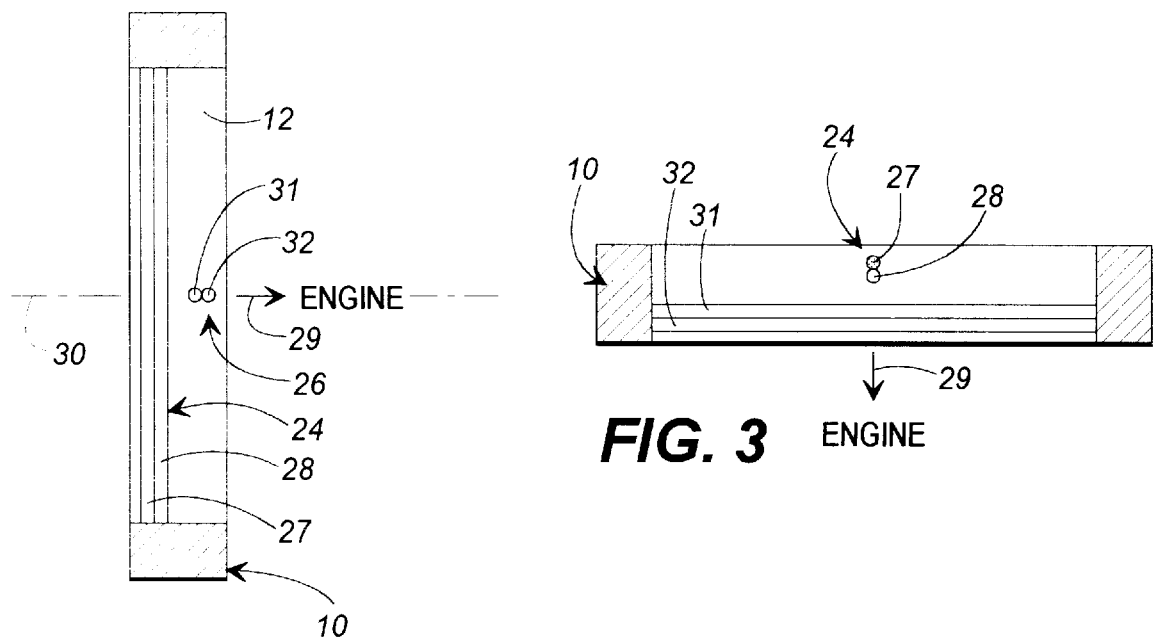
FIG. 2
FIG. 3

DUAL STAGE NITROUS OXIDE AND FUEL INJECTION PLATE

CROSS REFERENCE TO RELATED APPLICATION

This application claims the benefit of U.S. Provisional Application No. 60/033,351 filed Dec. 6, 1996.

FIELD OF THE INVENTION

This invention relates to a module that is placed between the carburetor and the intake manifold of an internal combustion engine for adding fuel and nitrous oxide to the airstream flowing from the carburetor to the engine.

BACKGROUND OF THE INVENTION

High performance internal combustion engines of the type used for drag racers and high speed racing vehicles have used a blend of fuels. One of the more common fuel combinations is high octane gasoline mixed with air, and the injection of additional gasoline in combination with nitrous oxide in the airstream as the airstream moves from the carburetor toward the internal combustion engine.

In the past, a module is placed between the carburetor and the intake manifold of the engine, and the module, otherwise known as a nitrous plate, functions to inject nitrous oxide and fuel into the airstream in a pattern that causes the fuel and nitrous oxide to thoroughly mix together as the mixture approaches the intake manifold.

An example of a prior art nitrous oxide and fuel injection module is a plate-like structure having an air passageway formed therethrough for passing the air and gas mixture from the carburetor with a pair of rectilinear conduits spanning the passageway of the module. The conduits are arranged parallel to one another and are arranged one behind the other with respect to the flow of air and fuel through the passageway. This presents effectively only one width of the conduits to the airstream, so as to minimize the obstruction to the airflow caused by the conduits. The conduits each include an internal passageway and spray ports which direct the fluid from inside the conduits outwardly into the air and fuel stream from the carburetor.

The upper conduit is supplied with liquid nitrogen under high pressure, such as 1000 psi, and the lower or downstream conduit is supplied with gasoline or other liquid fuel at about 40 psi. When the liquid nitrogen emerges from the ports of the supply conduit, it changes from a liquid state to a gaseous state. This change of state causes radical expansion of the nitrous oxide and a radical drop in temperature. The nitrous oxide is directed generally around the fuel supply tube so as to substantially envelope the fuel supply tube with the expanding, and turbulent nitrous oxide in its gaseous state. The fuel that is sprayed from the ports of the downstream fuel supply conduit is thoroughly mixed with the nitrous oxide and is carried with the air and fuel stream from the carburetor on toward the intake manifold of the engine.

One of the problems with the prior art nitrous oxide and fuel injection modules is that the nitrous oxide and fuel being injected into the airstream are not evenly or proportionately distributed across the entire cross section of the intake manifold and, therefore, are not uniformly supplied to the cylinders of the engine. This causes some of the cylinders to operate at a different performance rate than the others.

Therefore, there is a need for a nitrous oxide and fuel supply module that provides a more uniform and proportional mixture of nitrous oxide and fuel supplied to the airstream at a position downstream of the carburetor, at the intake manifold of the engine.

SUMMARY OF THE INVENTION

Briefly described, the present invention comprises a dual stage nitrous oxide and fuel supply module or plate that is placed between the carburetor and intake manifold of an internal combustion engine, with the module including an airstream passage for passing the stream of air and fuel from the carburetor to the engine, and with pairs of spray conduits extending across and spanning the passage of the module. One pair of spray conduits extends north and south, while the second pair of spray conduits extends east and west, at a right angle with respect to the first pair. Both pairs of spray conduits include an upstream spray conduit for the distribution of nitrous oxide into the passage, and a downstream spray conduit for the distribution of fuel into the passage. The nitrous oxide spray conduit of each pair of conduits has its nozzle openings oriented so as to form stream of nitrous oxide that generally converge about the downstream fuel spray conduit, so that the nitrous oxide tends to envelope the fuel that is being sprayed from the downstream spray conduit. The nitrous oxide is maintained at a high pressure, approximately 1000 psi in its spray conduits, so that the nitrous oxide is retained in its liquid state until it emerges from the spray ports of its conduit, whereupon the nitrous oxide changes state from a liquid to a gas, and its temperature drops, and its turbulence causes vigorous mixing of the nitrous oxide with the fuel that is being sprayed from the downstream fuel spray conduit. The spray ports of both the nitrous oxide spray conduits and the fuel spray conduits are directed laterally, generally across the passage of the module, so as to distribute the nitrous oxide and fuel generally across the airstream flowing from the carburetor to the engine.

The X-shaped or right angle arrangement of the first pair of spray conduits with the second pair of spray conduits assures that the nitrous oxide and fuel will be sprayed adequately into the four quadrants of the passage as formed by the spray conduits, assuring that each quadrant will receive an adequate dose of nitrous oxide and fuel. With this arrangement, there is an increased uniformity of the mixture of nitrous oxide, fuel and air as the mixture reaches the intake manifold for the engine.

Thus, it is an object of this invention to provide an improved dual stage nitrous oxide and fuel module for placement between the carburetor and the intake manifold of a high performance internal combustion engine.

Another object of this invention is to provide a means for better mixing and distributing of nitrous oxide and fuel in an intake manifold of a high performance internal combustion engine.

Other objects, features, and advantages of the present invention will become apparent upon reading the following specifications, when taken in conjunction with the accompanying drawings.

BRIEF DESCRIPTION OF THE DRAWINGS

FIG. 1 is a plan view of a dual stage nitrous oxide and fuel module.

FIG. 2 is a side cross-sectional view thereof taken along lines A—A of FIG. 1.

FIG. 3 is a side view thereof similar to FIG. 2, but taken along lines B—B of FIG. 1.

DETAILED DESCRIPTION

Figure 4:
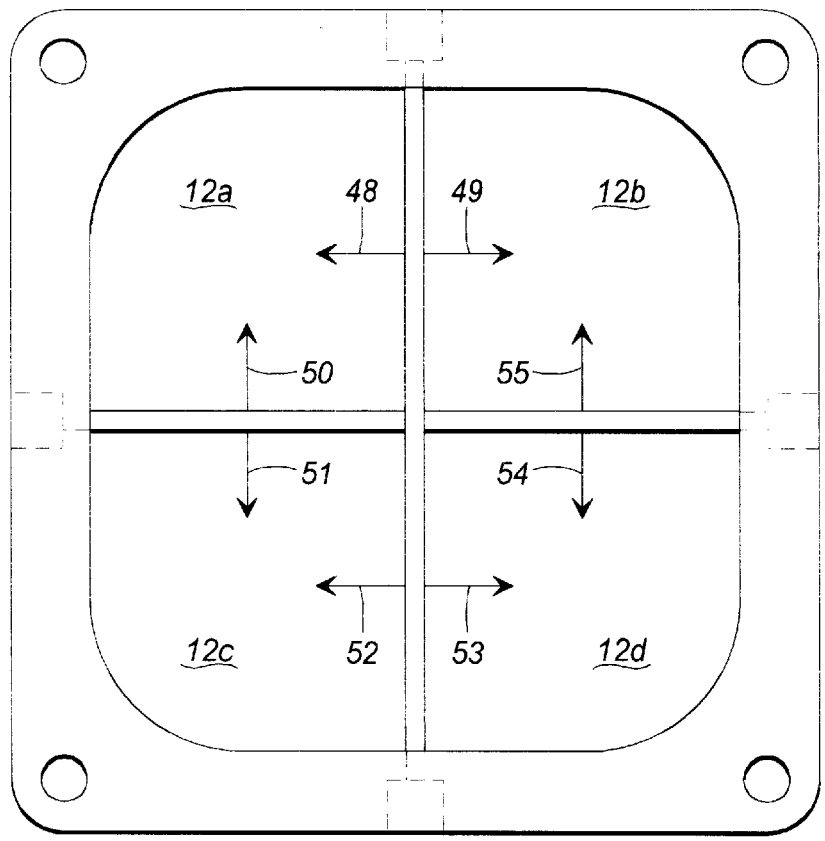
FIG. 4 is a plan view of the module, showing with arrows the direction of fuel and nitrous oxide as emitted from the spray conduits.

Referring now in more detail to the drawings, in which like numerals indicate like parts throughout the several views, FIG. 1 illustrates the nitrous oxide and fuel plate or module which is to be placed between a carburetor and the intake manifold in a high performance internal combustion engine. The module includes a plate 10 that is, in this embodiment of the invention, of rectangular outer shape, and which includes an internal passage 12 that is sized and shaped to receive the stream of air and fuel from the carburetor (not shown). The passageway is formed by sidewalls 14, 16, 18 and 20, with the openings 22 formed therein for connection between the carburetor and the intake manifold.

Pairs of spray conduits 24 and 26 are mounted at their ends to the plate 10, with the spray conduits spanning the passage 12. As shown in FIGS. 2 and 3, the pair of spray conduits 24 includes a pair of conduits 27 and 28 that are arranged parallel to one another, with the conduit 27 oriented upstream with respect to conduit 28 and with the conduit 28 oriented downstream with respect to conduit 27. The stream of air and fuel that is to move from the carburetor to the engine is indicated by arrow 29, which is parallel to the longitudinal axis 30 of the passage 12. Likewise, the pair of conduits 26 includes upstream conduit 31 and downstream conduit 32.

With regard to both pairs of conduits 24 and 26, the upstream conduits 27 and 31 are supplied with nitrous oxide, and the downstream conduits 28 and 32 are supplied with fuel, such as high octane gasoline.

Figure 5:
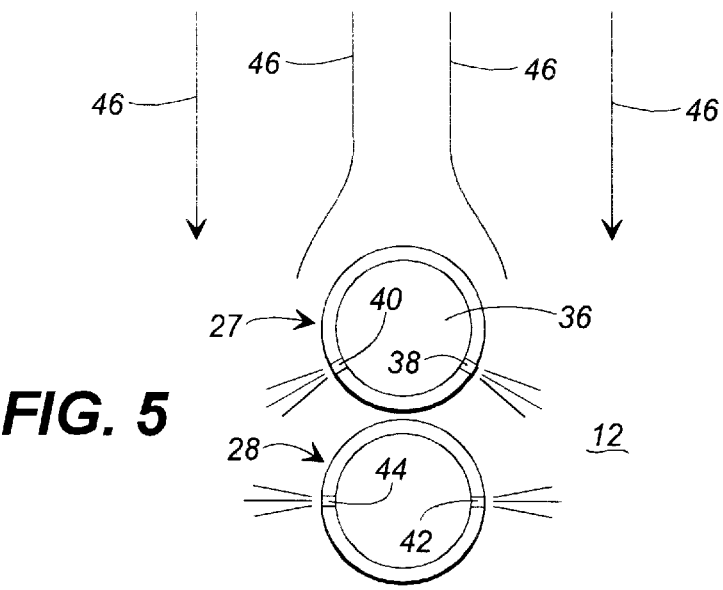
FIG. 5 is a schematic illustration of the flow pattern created from one of the pairs of spray conduits.

As illustrated in FIG. 5, the upstream nitrous oxide conduit, such as conduit 27 includes an internal passageway 36 and spray ports 38 and 40. The spray ports 38 and 40 are located approximately at the 4 o'clock and 8 o'clock positions of the conduit. The downstream fuel spray conduit 28 also includes spray ports 42 and 44, with the spray ports being oriented at approximately the 3 o'clock and 9 o'clock positions in the conduit. There are a series of spray ports 38, 40, 42 and 44 along their respective conduits, so as to provide a supply of nitrous oxide and fuel uniformly from the spray ports.

It will be noted that the spray ports 38 and 40 supply nitrous oxide in an arrangement or pattern that tends to envelope the spray conduit 28. In the meantime, the fuel being emitted from the spray ports 42 and 44 of the fuel spray conduit 28 extends substantially laterally and generally across the air flow from the carburetor, as indicated by flow arrows 46. The change of state of the nitrous oxide from liquid to gas as the nitrous oxide emerges through the spray ports 38 and 40 causes a substantial amount of expansion and turbulence in the flow passage 12 of the plate 10, so that the fuel from the spray conduit 28 is thoroughly mixed with the nitrous oxide and with the air and fuel stream moving from the carburetor.

As shown in FIG. 4, the arrows 48–55 illustrate the general directions of the nitrous oxide and fuel emitted from the spray conduits 27, 28, 31 and 32, showing that the fluids are properly propelled into and mixed within the quadrants 12a, 12b, 12c, and 12d of the passage 12 of the module. While single pairs of arrows are illustrated in FIG. 4, it will be understood that the spray ports 38, 40, 42 and 44 are arranged in a series along the lengths of the spray conduits, so that the spray is emitted substantially uniformly along the lengths of the spray conduits.

While a single embodiment of the invention has been disclosed and illustrated herein, it will be understood by those skilled in the art that variations and modifications thereof can be made without departing from the spirit and scope of the invention, as set forth in the following claims.

I claim:

1. A fuel supply module for adding fuel and nitrous oxide to an airstream flowing from a carburetor to the intake manifold of an internal combustion engine, comprising:

a plate member for placement between a carburetor and its intake manifold, said plate member defining an air passage therethrough sized and shaped for passing the airstream from a carburetor to an internal combustion engine, said air passage having a central axis extending parallel to the direction of flow of the gas moving through said opening;

a first pair of elongated rectilinear spray conduits each spanning said air passage of said plate member and having their opposed end portions mounted to said plate member, said first pair of spray conduits being mounted parallel to each other and oriented one behind the other along the axis of said air passage so that one of said first pair of spray conduits is positioned upstream and the other of said first pair of spray conduits is positioned downstream with respect to each other;

a second pair of elongated rectilinear spray conduits each spanning said air passage of said plate member and having their opposed end portions mounted to said plate member, said second pair of spray conduits being mounted parallel to each other and oriented one behind the other along the axis of said air passage so that one of said second pair of spray conduits is positioned upstream and the other of said second pair of spray conduits is positioned downstream with respect to each other;

said second pair of spray conduits being oriented at approximately a right angle with respect to said first pair of spray conduits;

each of said spray conduits of both pairs of spray conduits including a central passage extending internally along its length and spray openings formed laterally through said conduit from the central passage to outside said conduit;

nitrous oxide supply means for supplying liquid nitrous oxide to said upstream spray conduits of said first and second pairs of spray conduits; and fuel supply means for supplying liquid fuel to said downstream spray conduits of said first and second pairs of spray conduits.

* * * * *